US012556864B2

(12) United States Patent
Park et al.

(10) Patent No.: US 12,556,864 B2
(45) Date of Patent: Feb. 17, 2026

(54) WEARABLE HELMET CAPABLE OF RECORDING 3D SOUND, 3D SOUND SYSTEM USING THE SAME, AND METHOD THEREOF

(71) Applicants: HYUNDAI MOTOR COMPANY, Seoul (KR); Kia Corporation, Seoul (KR)

(72) Inventors: Jong Suh Park, Seongnam-si (KR); Daniel Pinardi, Parma (IT); Nicholas Rocchi, Parma (IT); Andrea Toscani, Parma (IT); Angelo Farina, Parma (IT); Marco Binelli, Parma (IT)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 162 days.

(21) Appl. No.: 18/519,990

(22) Filed: Nov. 27, 2023

(65) Prior Publication Data

US 2025/0024202 A1 Jan. 16, 2025

(30) Foreign Application Priority Data

Jul. 14, 2023 (KR) ........................ 10-2023-0091974

(51) Int. Cl.
*H04R 5/033* (2006.01)
*H04R 5/04* (2006.01)

(52) U.S. Cl.
CPC ............... *H04R 5/033* (2013.01); *H04R 5/04* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 7,430,300 | B2 * | 9/2008 | Vosburgh | H04R 3/005 181/129 |
| 9,471,900 | B1 * | 10/2016 | Boustany | G07C 1/10 |
| 10,219,571 | B1 * | 3/2019 | Aloumanis | G08G 1/167 |
| 11,412,806 | B2 * | 8/2022 | Röschmann-Foudhaili | A42B 3/08 |
| 12,063,484 | B2 * | 8/2024 | Hansen | G10L 17/26 |
| 2013/0101136 | A1 | 4/2013 | McElveen | |
| 2014/0189937 | A1 * | 7/2014 | Pietrzak | A42B 3/062 2/410 |
| 2016/0165342 | A1 | 6/2016 | Benattar | |
| 2017/0048496 | A1 * | 2/2017 | Hobby | A42B 3/042 |
| 2018/0007994 | A1 * | 1/2018 | Boesen | A42B 3/30 |
| 2019/0268550 | A1 * | 8/2019 | Arnold | A42B 3/042 |
| 2019/0379969 | A1 | 12/2019 | Fontana et al. | |

FOREIGN PATENT DOCUMENTS

| | | | |
|---|---|---|---|
| WO | 2014-079578 | A1 | 5/2014 |

* cited by examiner

*Primary Examiner* — Paul W Huber
(74) *Attorney, Agent, or Firm* — MORGAN, LEWIS & BOCKIUS LLP

(57) ABSTRACT

A wearable helmet capable of recording a 3D sound, a 3D sound system using the same, and a method therefor. An exemplary embodiment of the present disclosure provides a wearable helmet capable of 3D sound recording, including: one or more microphones configured to collect surrounding sound sources; and an analog-to-digital converter configured to convert the sound sources collected through the at least one microphone into digital signals and to provide the digital signals to an external signal conversion device.

19 Claims, 11 Drawing Sheets

WEARABLE HELMET CAPABLE OF RECORDING 3D SOUND, 3D SOUND SYSTEM USING THE SAME, AND METHOD THEREOF

CROSS-REFERENCE TO RELATED APPLICATION

This application claims priority to and the benefit of Korean Patent Application No. 10-2023-0091974, filed in the Korean Intellectual Property Office on Jul. 14, 2023, the entire contents of which are incorporated herein by reference.

BACKGROUND

(a) Technical Field

The present disclosure relates to a wearable helmet capable of recording a 3D sound, a 3D sound system using the same, and a method therefor, and more particularly to a technique for recording a 3D sound having a sense of space and direction around a user using a wearable helmet equipped with one or more plurality of microphones.

(b) Description of the Related Art

A plurality of speakers may exist in a vehicle or indoor space. A desired sound may be separately provided or a 3D sound may be provided according to each user's position in the vehicle and each user's personal characteristic by adjusting an amplitude and a direction of sounds outputted from the speakers.

Sounds must be recorded through a microphone in order to effectively provide such a 3D sound, to determine an amplitude and a direction of sounds heard from a position of a user, and to adjust an amplitude and a direction of sounds from a speaker. To this end, a plurality of microphones are used to improve a signal-to-noise ratio (S/N) of a sound pressure signal, and the microphones may be temporarily mounted to record sounds, and then the recorded sounds may be analyzed to adjust a sound volume and a direction of the speaker.

Conventionally, in response to a case where a sound is to be recorded in a vehicle, a microphone and a microphone cradle are provided, the microphone cradle is positioned in a driver seat, and then the microphone is mounted on the cradle to record the sound.

However, in a state where such a cradle is used, there may be a difference from a sound heard while a user is actually seated in the driver seat. For example, accurate sound information may not be obtained due to differences in various conditions, such as a height of the cradle, a user's sitting height, and a user's head position.

Accordingly, it may be necessary to record a sound in a same condition as a state where the user is seated in the vehicle, but conventionally, it is difficult to position a microphone for sound recording in the same condition as the state where the user is seated.

SUMMARY

An exemplary embodiment of the present disclosure attempts to provide a wearable helmet capable of recording a 3D sound, a 3D sound system using the same, which may record a 3D sound source under a same condition as a state where a user is seated in a vehicle.

In addition, an exemplary embodiment of the present disclosure attempts to provide a wearable helmet capable of recording a 3D sound, a 3D sound system using the same, which may record a 3D sound that may minimize cable bulk, cost, and communication obstacles boy providing a sound source collected from the wearable helmet to an external signal conversion device using an automotive audio bus (A2B) cable.

The technical objects of the present disclosure are not limited to the objects mentioned above, and other technical objects not mentioned may be clearly understood by those skilled in the art from the description of the claims.

An exemplary embodiment of the present disclosure provides a wearable helmet capable of 3D sound recording, including: one or more microphones configured to collect surrounding sound sources; and an analog-to-digital converter configured to convert the sound sources collected through the one or more microphones into digital signals and to provide the digital signals to an external signal conversion device.

In an exemplary embodiment of the present disclosure, the one or more microphones may be arranged at a predetermined interval on a surface of the wearable helmet.

In an exemplary embodiment of the present disclosure, a first side of the wearable helmet may be configured to connect to a cable, and the wearable helmet may further include a connector at the first side of the wearable helmet and configured to transmit the digital signals to an outside of the wearable helmet through the cable.

In an exemplary embodiment of the present disclosure, the connector may include an Ethernet connector or an automotive audio bus (A2B) connector.

An exemplary embodiment of the present disclosure provides a 3D sound system including: a wearable helmet configured to convert sound sources collected through one or more microphones into digital signals; and a signal conversion device configured to receive the digital signals from the wearable helmet and to provide the digital signals to an external analysis device.

In an exemplary embodiment of the present disclosure, the wearable helmet is configured to transmit the digital signals to the signal conversion device through a cable.

In an exemplary embodiment of the present disclosure, the cable may include an Ethernet connector or an automotive audio bus (A2B) connector.

In an exemplary embodiment of the present disclosure, the wearable helmet may further include an analog digital converter configured to convert analog signals of the sound sources into the digital signals.

In an exemplary embodiment of the present disclosure, the wearable helmet may be configured to receive power from the signal conversion device.

In an exemplary embodiment of the present disclosure, the signal conversion device may be configured to include a master configured to receive the digital signals from the wearable helmet, to convert the digital signals into USB signals, and to transmit the USB signals to the analysis device.

In an exemplary embodiment of the present disclosure, the master may include: an A2B connector configured to receive the digital signals; and a USB connector configured to output the USB signals.

In an exemplary embodiment of the present disclosure, the master may further include a power application device configured to receive power from an external power supply.

In an exemplary embodiment of the present disclosure, the system may further include a digital-to-analog converter configured to receive the digital signals from the master and to convert the digital signals into analog signals to output the analog signals to an outside.

In an exemplary embodiment of the present disclosure, the digital-to-analog converter may be further configured to receive power from the master to transmit the power to the wearable helmet.

In an exemplary embodiment of the present disclosure, the wearable helmet may be configured to be worn by a driver in a vehicle to collect surrounding sound sources.

An exemplary embodiment of the present disclosure provides a method of operating a 3D sound system, including: collecting, by a wearable helmet worn by a driver, surrounding sound sources; converting, by the wearable helmet, the surrounding sound sources into digital signals; and transmitting, by a signal conversion device, the digital signals received from the wearable helmet to an external analysis device.

In an exemplary embodiment of the present disclosure, the transmitting of the digital signals may include converting, by the signal conversion device, the digital signals into universal serial bus (USB) signals to transmit the USB signals to the external analysis device through a USB connector.

In an exemplary embodiment of the present disclosure, the method may further include converting, by the signal conversion device, the digital signals into analog signals to output them to an outside.

In an exemplary embodiment of the present disclosure, the method may further include: receiving, by the signal conversion device, power from an external power supply; and providing, by the signal conversion device, the power to the wearable helmet.

In an exemplary embodiment of the present disclosure, transmitting, by the wearable helmet, the digital signals to the signal conversion device through an Ethernet cable or an automotive audio bus (A2B) cable.

According to the present technique, it is possible to record a 3D sound source under a same condition as a state where a user is seated in a vehicle, thereby increasing accuracy of 3D sound analysis while driving the vehicle.

In addition, according to the present disclosure, it is possible to minimize cable bulk, cost, and communication obstacles by providing a sound source collected from the wearable helmet to an external signal conversion device using an automotive audio bus (A2B) cable.

Furthermore, various effects that may be directly or indirectly identified through this document may be provided.

DETAILED DESCRIPTION

Figure 1:
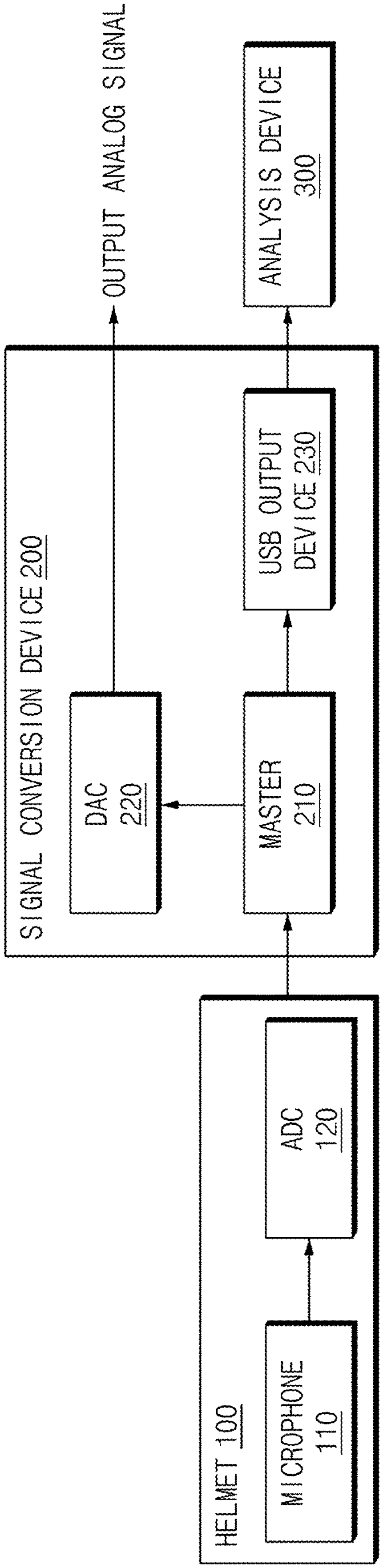
FIG. 1 illustrates a block diagram showing a configuration of an example 3D sound system including a wearable helmet capable of 3D sound recording.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In describing an exemplary embodiment, when it is determined that a detailed description of the well-known configuration or function associated with the exemplary embodiment may obscure the gist of the present disclosure, it will be omitted.

In describing constituent elements according to an exemplary embodiment, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 10.

A vehicle may provide a 3D immersive sound experience to a user through a vehicle sound device. A vehicle sound device may include a multimedia device, a navigation terminal or an audio video navigation system (AVN) system, and a plurality of speakers.

The vehicle sets 3D sound positions of a plurality of speakers to provide such a 3D immersive sound experience. In order to set such a 3D sound position, it may be necessary to understand a 3D sound that a driver hears from a driver seat position during driving, and thus it may be necessary to record it under same conditions and for this recording, a wearable helmet equipped with a microphone according to an exemplary embodiment of the present disclosure is used.

The wearable helmet equipped with the microphone according to the exemplary embodiment of the present disclosure may be worn on a user's head while a user is seated in the driver seat to record 3D sound around the user. FIG. 1 illustrates a block diagram showing a configuration of an example 3D sound system including a wearable helmet capable of 3D sound recording.

Referring to FIG. 1, the 3D sound system according to an embodiment of the present disclosure may include a wearable helmet 100, a signal conversion device 200, and an analysis device 300.

The wearable helmet 100 may include a built-in microphone 110 to record a 3D sound having sympathy and directionality, and may be easy to carry.

The wearable helmet 100 may include a microphone 110 and an analog to digital converter (ADC) (hereinafter referred to as an ADC) 120.

Figure 2:
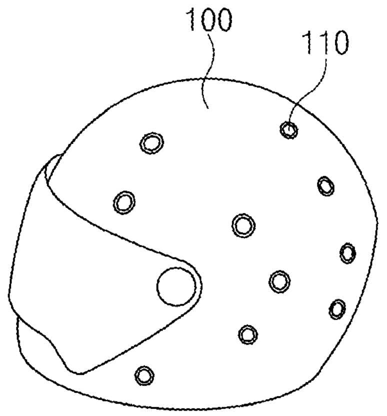
FIG. 2 illustrates an example appearance of a wearable helmet capable of 3D sound recording.

The microphone 110 is formed to include 32 microphonic capsules capable of collecting ambient sounds, and as illustrated in FIG. 2, the 32 microphones 110 are mounted on the helmet 100 at regular intervals. FIG. 2 illustrates an example appearance of a wearable helmet capable of 3D sound recording. Referring to FIG. 2, the 32 microphones 110 dispersed at regular intervals are mounted on an entire surface of the helmet 100. In addition, the 32 microphones 110 may be positioned for Ambisonics (i.e., beam-forming). Ambisonics is a method of recording and playing back 3D audio with a horizontal and vertical surround or a 360-degree surround from a single-point source. In addition, 32 analog signals inputted through the 32 microphones are synchronized and transferred to the ADC 120.

The ADC 120 receives 32 analog signals inputted through the microphones 110 through wires, converts the 32 analog signals into 32 digital signals, and transfers the signals to the signal conversion device 200. In this case, the ADC 120 synchronizes the 32 digital signals and transfers them to the signal conversion device 200. For the ADC 120, a short cable that is resistant to electromagnetic interference and strong to S/N may be used instead of a bulky wire.

In addition, the signal conversion device 200 is provided outside the wearable helmet 100, receives a digital signal from the wearable helmet 100, and performs signal processing to send it to the external analysis device 300. In this case, the signal processing may include converting a digital signal from the wearable helmet 100 into a signal to be outputted through a universal serial bus (USB) output device 230. In addition, the signal conversion device 200 may convert a digital signal from the wearable helmet 100 into an analog signal to output it to the outside. In addition, the signal conversion device 200 may receive 12 V power from a power supply device (e.g., a power supply) to apply the 12V power to the wearable helmet 100.

The signal conversion device 200 may include a master 210, a digital to analog converter (DAC) 220, and a USB output device 230.

The master 210 may convert a digital signal received through an automotive audio bus (A2B) bus into a USB signal that may be outputted to the USB output device 230. The USB signal is a signal that may be transmitted through a USB port, and may support 32 signals of 24 bits at a current standard sampling frequency (fs) for audio (fs=48 kHz). The A2B bus is a standard bus for a vehicle audio service.

The DAC 220 may convert the digital signal received from the master 210 into an analog signal to output it.

The USB output device 230 transfers the digital signal to the PC 310. That is, 3D sound signals inputted through the microphones 110 of the wearable helmet 100 may be directly recorded in the PC 310 through the USB output device 230.

The wearable helmet 100 and the signal conversion device 200 may be electrically connected, and the ADC 120, the DAC 220, the master 210, etc. may electrically control each component, and may be an electric circuit that executes software commands, thereby performing various data processing and calculations described below.

The ADC 120 may process a signal transferred between components of the wearable helmet 100 to perform overall control such that each of the components may perform its function normally. The ADC 120, the DAC 220, the master 210, etc. may be implemented in the form of hardware, software, or a combination of hardware and software.

Figure 3:
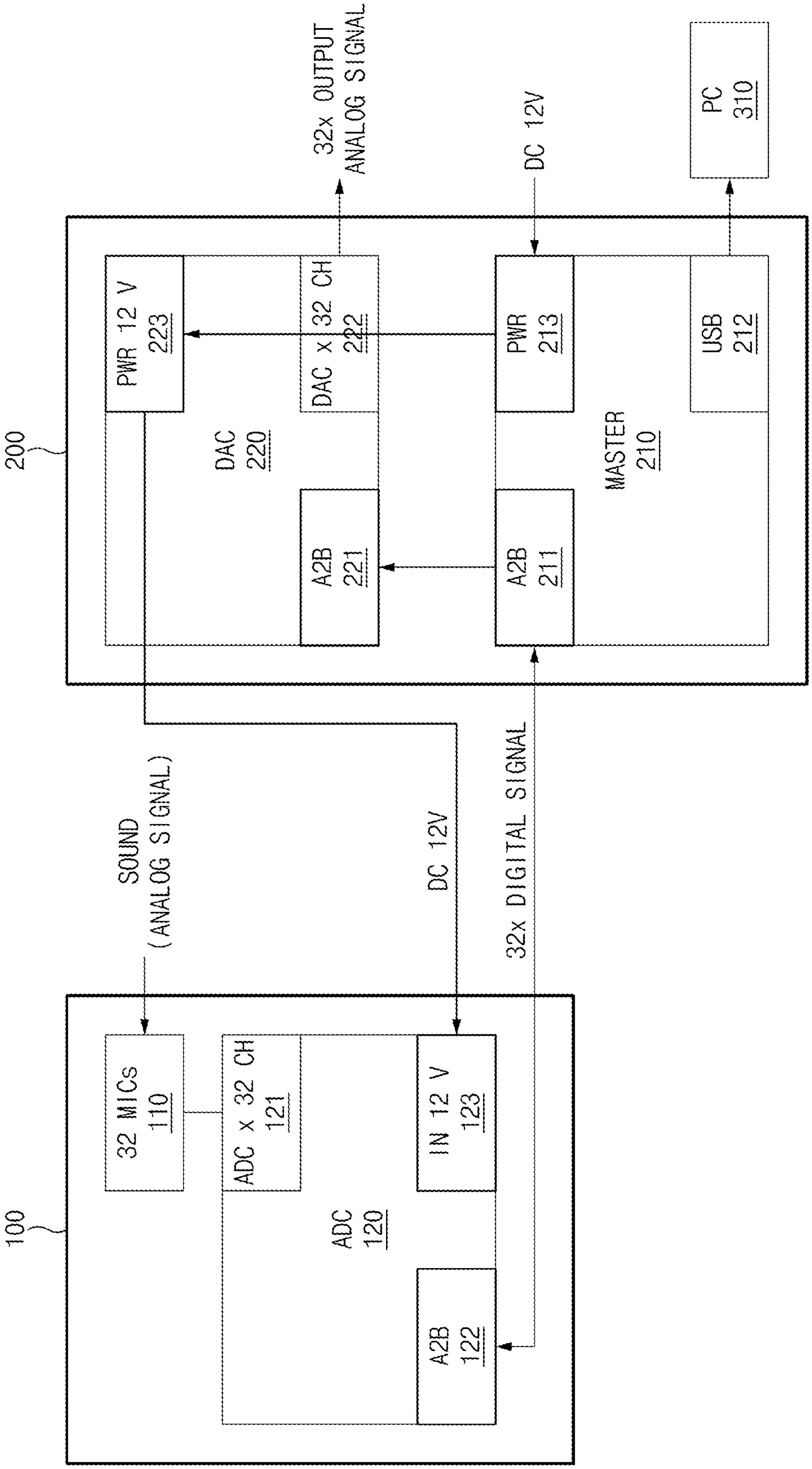
FIG. 3 illustrates an example of a configuration of a 3D sound system of a wearable helmet capable of 3D sound recording.

FIG. 3 illustrates an example of a configuration of a 3D sound system of a wearable helmet capable of 3D sound recording.

Referring to FIG. 3, the ADC 120 may include a conversion device for converting the 32 analog signals inputted from 32 microphones 110 into digital signals, an A2B connector 122 for transmitting and receiving the digital signals through an automotive audio bus (A2B) 201, and a power application device 123 for receiving power.

The A2B 201 (see FIG. 4) connected through the A2B connector 122 may use a unshielded twisted pair (UTP) cable including two twisted wires, and such an A2B may minimize cable weight and complexity.

Figure 4:
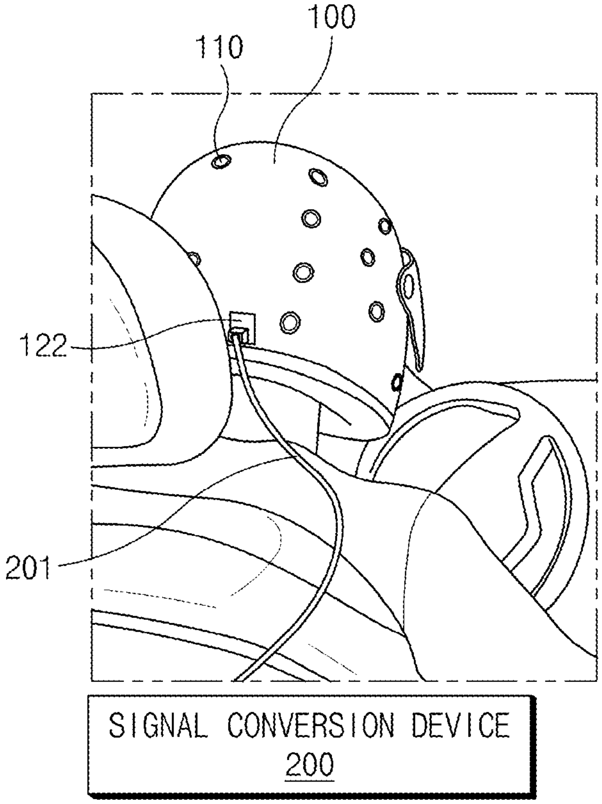
FIG. 4 illustrates an example of a user wearing a wearable helmet capable of 3D sound recording.
Figure 5:
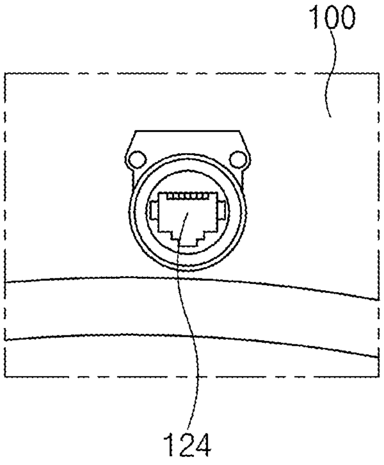
FIG. 5 illustrates an example of an A2B signal connector of a wearable helmet capable of 3D sound recording.

In this case, the A2B connector 122 may be provided as an Ethernet connector 124 (FIG. 5), and may transmit a digital signal to the signal conversion device 200 through a cable 201 (see FIG. 4). In this case, FIG. 4 illustrates an example of a user wearing a wearable helmet capable of 3D sound recording, and FIG. 5 illustrates an example of an A2B signal connector of a wearable helmet capable of 3D sound recording. If the Ethernet connector and the A2B connector are different, please consider amending the specification to read "the A2B connector 122 may be replaced by_an Ethernet connector 124 (FIG. 5).

As illustrated in FIG. 4, a driver may record surrounding 3D sounds while driving in a state of wearing the wearable helmet 100. The cable 201, which is a standard cable, may include a robust but low-bulk cable, and may be configured with a sufficient length to be connected with the external signal conversion device 200.

The Ethernet connector 124 is mounted at an outside (e.g., a back side) of the wearable helmet 100 as illustrated in FIG. 5, and the Ethernet cable includes three twisted pairs and is unshielded. It may be connected with a cable of up to 10 meters in length, and one Ethernet cable may be up to 100 meters long.

The signal conversion device 200 includes a master 210 and a DAC 220, and in FIG. 2, the USB output device 230 is illustrated as an element included in the master 210 as a USB connector 212.

The master 210 includes an A2B connector 211, a USB connector 212, and a power application device 213.

The A2B connector 211 may receive a digital signal from the A2B connector 122 of the helmet 100, and may transfer the digital signal to the A2B connector 221 of the DAC 220.

The USB connector 212 may output a USB signal to an external PC 310. In this case, a USB cable may be used, and the PC 310 is an example of the analysis device 300 in FIG. 1.

The power application device 213 receives power through a power supply device such as an external power supply, and applies the power to a power application device 223 of the DAC 220.

The DAC 220 may include a conversion device 222 for converting 32 inputted digital signals into analog signals, an A2B connector 221 for transmitting and receiving digital signals through an automotive audio bus (A2B), and a power application device 223.

An analysis device 300 may receive a digital signal from the USB connector 212 to analyze the digital signal.

A cable is used to connect the helmet 100 and the signal conversion device 200, and the cable is robust and small in volume, and a standard cable or a connector may be used for the helmet 100 and the signal conversion device 200.

In this case, a DC 12 V voltage supplied to the master 210 may be transferred to the ADC 120 through the DAC 220. In addition, the ADC 120 of the wearable helmet 100, the master 210 and the DAC 220 of the signal conversion device 200 may transmit and receive A2B signals, which are digital signals.

Figure 6:
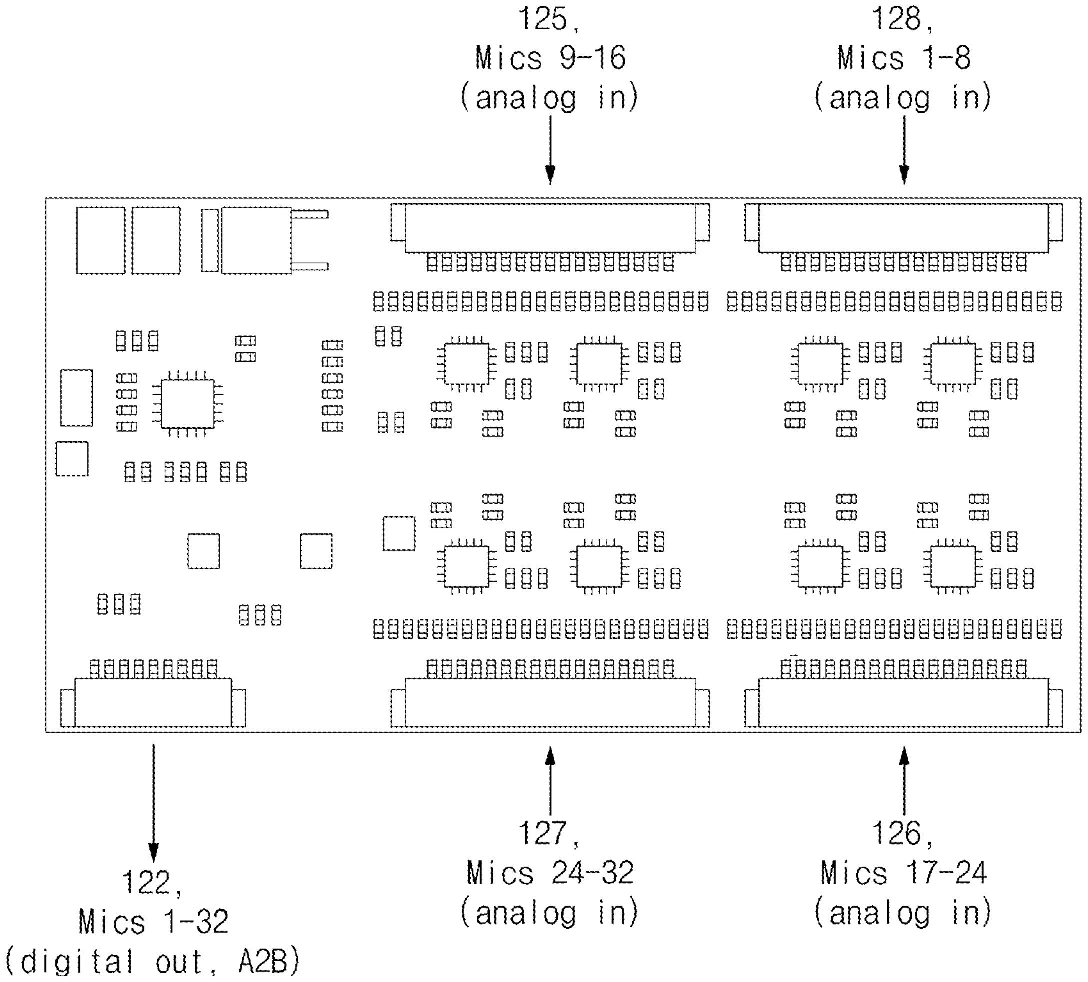
FIG. 6 illustrates an example of an ADC board of a wearable helmet capable of 3D sound recording.

FIG. 6 illustrates an example of an ADC board of a wearable helmet capable of 3D sound recording.

The ADC board of FIG. 6 is mounted at a rear side within the helmet 100, and includes the A2B connector 122 for outputting digital signals, and input ports 125, 126, 127, and 128 to which signals of microphones 1 to 32 are inputted at a first side of a PCB.

Figure 7A:
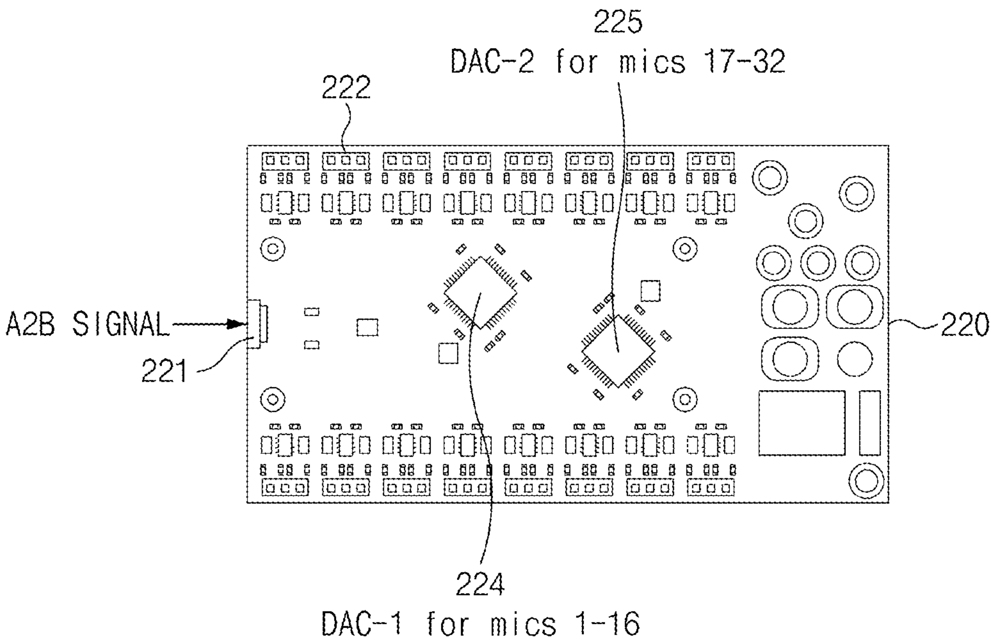
FIG. 7A and FIG. 7B each illustrates an example of a DAC board of a signal conversion device.
Figure 7B:
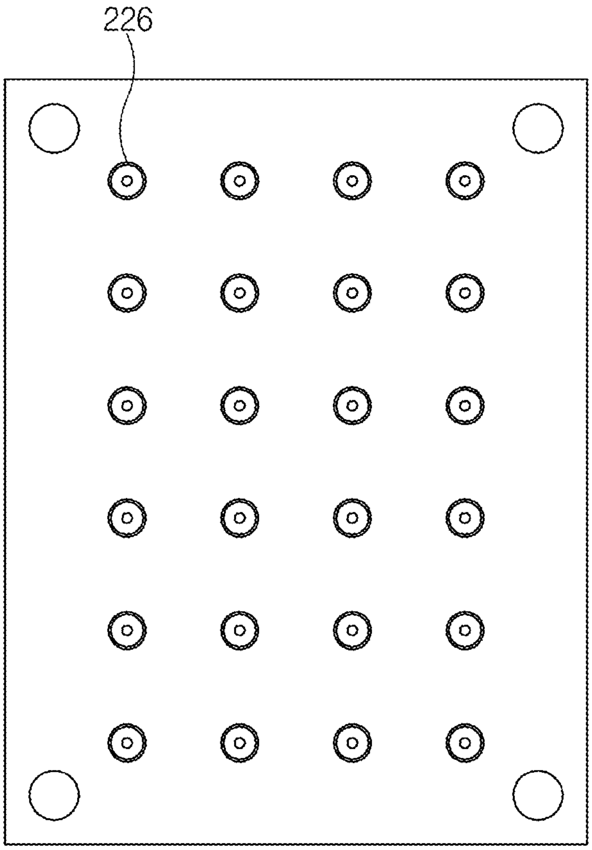

FIG. 7A illustrates an example of a front surface of a DAC board of a signal conversion device, and FIG. 7B illustrates an example of a rear surface of the DAC board of the signal conversion device.

Referring to FIG. 7A and FIG. 7B, the DAC 220 includes conversion devices 224 and 225 for converting 32 digital signals into analog signals, an A2B connector 221 to which an A2B signal is applied, and a BNC connector 226 to which an analog signal is outputted. That is, the DAC 220 may output 32 analog signals through 32 BNC connectors 226. The BNC connector 226 may be one of high frequency coaxial connectors.

Figure 8:
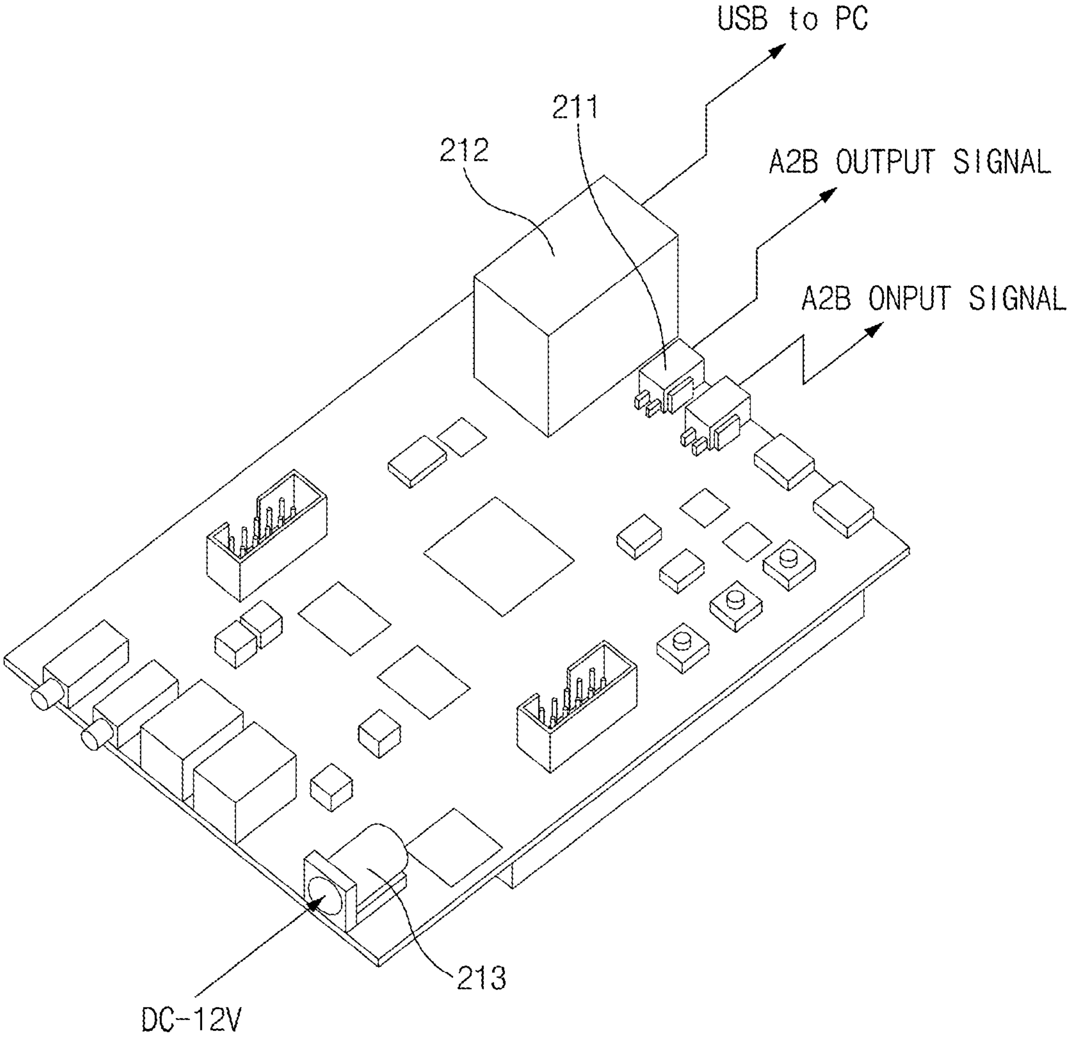
FIG. 8 illustrates an example of an A2B master of a signal conversion device.

FIG. 8 illustrates an example of an A2B master of a signal conversion device.

Referring to FIG. 8, the master 210 includes a power application device 213 for receiving power from a power supply, a USB connector 212 for outputting a USB signal, and an A2B connector 211, and transmits a digital signal to an external PC through the USB connector 212, and outputs or receives an A2B signal, which is a digital signal, through the A2B connector 211. In addition, a DC 12 V voltage is supplied through the power application device 213.

Figure 9:
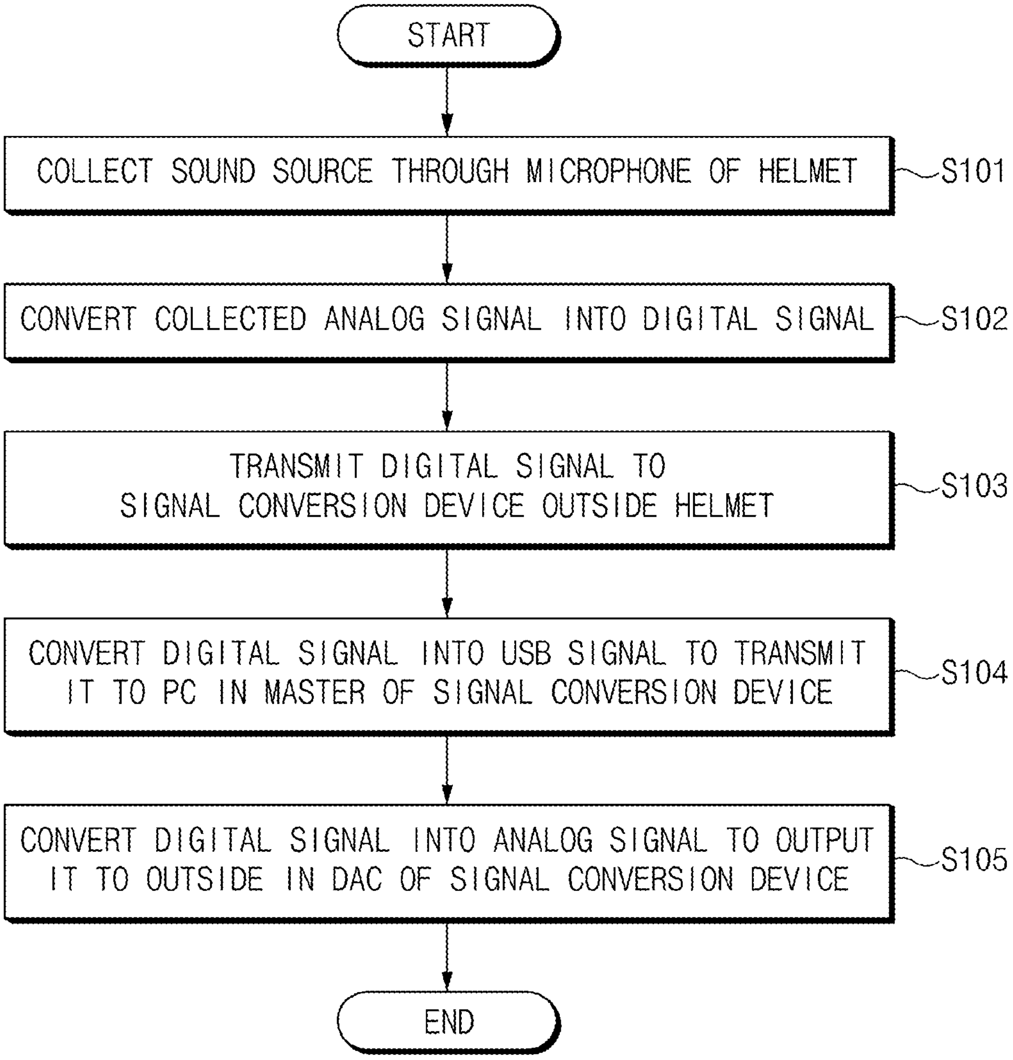
FIG. 9 illustrates a flowchart showing an example method of operating a 3D sound system.

Hereinafter, a method of operating a 3D sound system according to an exemplary embodiment of the present disclosure will be described with reference to FIG. 9. FIG. 9 illustrates a flowchart showing an example operating method of a 3D sound system.

Hereinafter, it is assumed that the wearable helmet 100 of FIG. 1 and the signal conversion device 200 performs processes of FIG. 9. In addition, in the description of FIG. 9, operations described as being performed by a device may be understood as being controlled by the ADC 120 of the wearable helmet 100 and the master 210 and the DAC 220 of the signal conversion device 200.

Referring to FIG. 9, the microphone 110 mounted on the wearable helmet 100 while a user sits in a driver seat and wears the wearable helmet 100 on the head collects surrounding 3D sound sources and transmits them to the ADC 120 (S101).

Next, the ADC 120 converts the 3D sound sources, that is, analog signals transmitted through the microphones 110 into digital signals (S102).

The ADC 120 transmits the converted digital signals to the external signal conversion device 200 of the wearable helmet 100 (S103). Next, the master 210 of the signal conversion device 200 may convert the digital signals into USB signals to transmit them to the PC (S104).

The DAC 220 of the signal conversion device 200 may convert digital signals into analog signals to output them to the outside (S105).

As such, according to the present disclosure, surrounding sound sources may be collected through the wearable helmet 100 worn by a driver, and the surrounding sound sources may be converted into digital signals in the wearable helmet 100, and then may be transmitted to the signal conversion device 200, and the signal conversion device 200 may process the digital signals received from the wearable helmet 100 to transmit them to the external analysis device 300.

In this case, according to the present disclosure, the signal conversion device 200 may convert the digital signals into the universal serial bus (USB) signals to transmit them to the analysis device 300 through a USB connector, and the signal conversion device 200 may convert the digital signals into the analog signals to output them to the outside.

In addition, the signal conversion device 200 may receive power from an external power supply to provide power to the wearable helmet 100, so that the wearable helmet 100 may be operated using this power.

In addition, the wearable helmet 100 may transmit the digital signals to the signal conversion device 200 through an Ethernet cable or an automotive audio Bus (A2B) cable.

As such, the present disclosure is advantageous in data transmission through the onboard ADC and the A2B bus, and wires may be implemented simply. In addition, with the A2B bus, it is possible to provide advantages such as up to 32 microphonic capsules, optimized wires (standard Ethernet cables and connectors, up to 10 m long, thin, robust, unshielded, and inexpensive), synchronization between all signals, and the ability to supply DC power.

Figure 10:
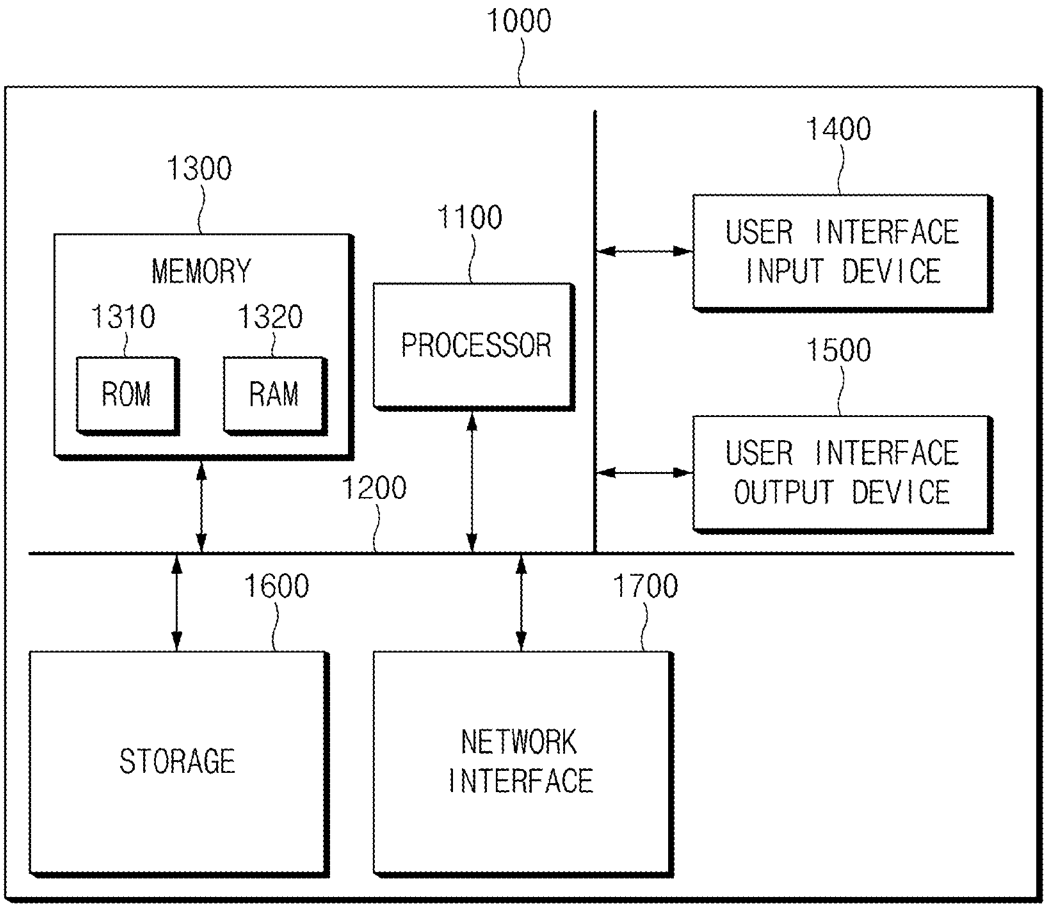
FIG. 10 illustrates an example computing system.

FIG. 10 illustrates an example computing system.

Referring to FIG. 10, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm, the converter, the master, and devices described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which may read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A wearable helmet capable of recording a 3D sound, comprising:
   one or more microphones configured to collect surrounding sound sources;
   an analog-to-digital converter configured to convert the sound sources collected through the one or more microphones into digital signals and to provide the digital signals to an external signal conversion device; and
   an automotive audio bus (A2B) connector configured to transmit the digital signals to the external signal conversion device through a cable.

2. The wearable helmet of claim 1, wherein
   the one or more microphones are arranged at a predetermined interval on a surface of the wearable helmet.

3. The wearable helmet of claim 1, wherein a first side of the wearable helmet is configured to connect to the cable, and the wearable helmet further comprises a connector at the first side of the wearable helmet and configured to transmit the digital signals to an outside of the wearable helmet through the cable.

4. The wearable helmet of claim 3, wherein
   the connector further includes an Ethernet connector.

5. A 3D sound system comprising:
   a wearable helmet configured to convert sound sources collected through one or more microphones into digital signals; and
   a signal conversion device configured to receive the digital signals from the wearable helmet and to provide the digital signals to an external analysis device,
   wherein the wearable helmet includes an automotive audio bus (A2B) connector configured to transmit the digital signals to the external analysis device through a cable.

6. The 3D sound system of claim 5, wherein
   the wearable helmet is configured to transmit the digital signals to the signal conversion device through the cable.

7. The 3D sound system of claim 6, wherein the cable further includes an Ethernet connector.

8. The 3D sound system of claim 7, wherein the wearable helmet further includes an analog digital converter configured to convert analog signals of the sound sources into the digital signals.

9. The 3D sound system of claim 5, wherein the wearable helmet is configured to receive power from the signal conversion device.

10. The 3D sound system of claim 5, wherein the signal conversion device includes a master configured to receive the digital signals from the wearable helmet, to convert the digital signals into USB signals, and to transmit the USB signals to the external analysis device.

11. The 3D sound system of claim 10, wherein the master includes:
   an A2B connector configured to receive the digital signals; and
   a USB connector configured to output the USB signals.

12. The 3D sound system of claim 10, wherein the master further includes a power application device configured to receive power from an external power supply.

13. The 3D sound system of claim 10, further comprising a digital-to-analog converter configured to receive the digital signals from the master and to convert the digital signals into analog signals to output the analog signals to an outside of the wearable helmet.

14. The 3D sound system of claim 13, wherein the digital-to-analog converter is further configured to receive power from the master to transmit the power to the wearable helmet.

15. The 3D sound system of claim 5, wherein the wearable helmet is configured to be worn by a driver in a vehicle to collect surrounding sound sources.

16. A method of operating a 3D sound system, comprising:
   collecting, by a wearable helmet worn by a driver, surrounding sound sources;
   converting, by the wearable helmet, the surrounding sound sources into digital signals; and
   transmitting, by a signal conversion device, the digital signals received from the wearable helmet to an external analysis device,
   transmitting, by the wearable helmet, the digital signals to the signal conversion device through an automotive audio bus (A2B) cable.

17. The method of claim 16, wherein the transmitting of the digital signals includes converting, by the signal conversion device, the digital signals into universal serial bus (USB) signals to transmit the USB signals to the external analysis device through a USB connector.

18. The method of claim 16, further comprising converting, by the signal conversion device, the digital signals into analog signals to output them to an outside of the wearable helmet.

19. The method of claim 16, further comprising:
   receiving, by the signal conversion device, power from an external power supply; and
   providing, by the signal conversion device, the power to the wearable helmet.

* * * * *